United States Patent [19]
Evers

[11] 3,924,346
[45] Dec. 9, 1975

[54] FISHING EQUIPMENT
[75] Inventor: Albert Leo Evers, St. Louis, Mo.
[73] Assignee: Frank Apostol, East St. Louis, Ill.
[22] Filed: July 29, 1974
[21] Appl. No.: 492,427

[52] U.S. Cl. .................. 43/26.2; 43/23; 43/44.98
[51] Int. Cl.² .................. A01K 85/06; A01K 91/00
[58] Field of Search .......... 43/26.2, 26.1, 23, 44.98

[56]         References Cited
         UNITED STATES PATENTS
| | | | |
|---|---|---|---|
| 2,274,255 | 2/1942 | Pierce | 43/44.98 |
| 2,583,660 | 1/1952 | Moore | 43/44.99 X |
| 2,748,525 | 6/1956 | Volz | 43/44.98 |
| 2,796,605 | 6/1957 | Ashley | 43/26.2 |
| 3,269,049 | 8/1966 | Emmons | 43/23 |
| 3,798,823 | 3/1974 | Watters et al. | 43/23 |

*Primary Examiner*—Louis G. Mancene
*Assistant Examiner*—Daniel J. Leach
*Attorney, Agent, or Firm*—Rogers, Ezell & Eilers

[57]            ABSTRACT

A tubular line of flexible material is used to cast or throw a lure onto the surface of a body of water; and an air-moving device, which is connected to one end of the line, is used to cause the lure to move in a life-like manner either on the surface or under the body of water. If the lure is a small "surface" lure, the air-moving device can be used to selectively draw water into, or expel water from, the free end of the line, and can thereby cause the life-like movement of the lure below, or on, the surface of the water.

10 Claims, 14 Drawing Figures

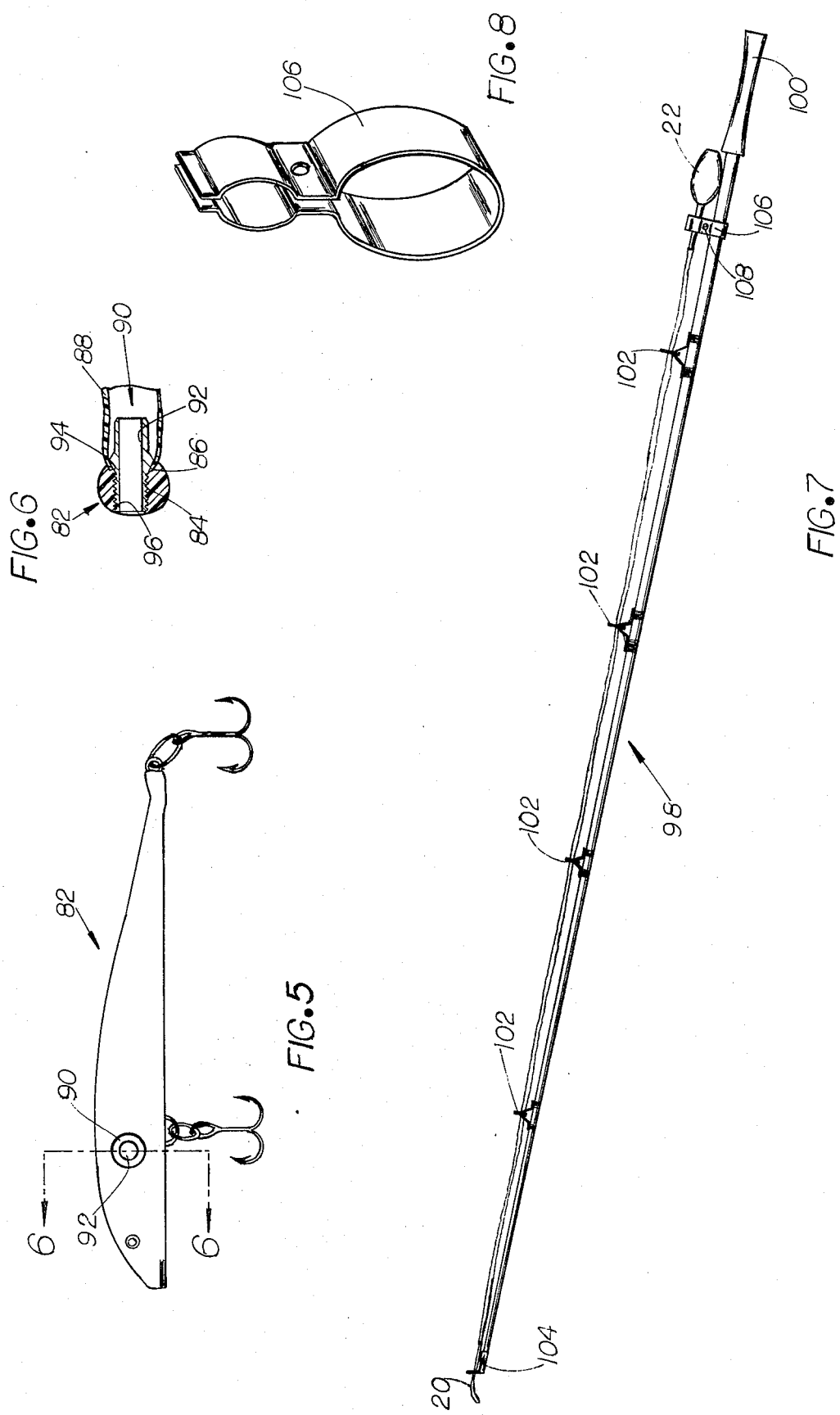

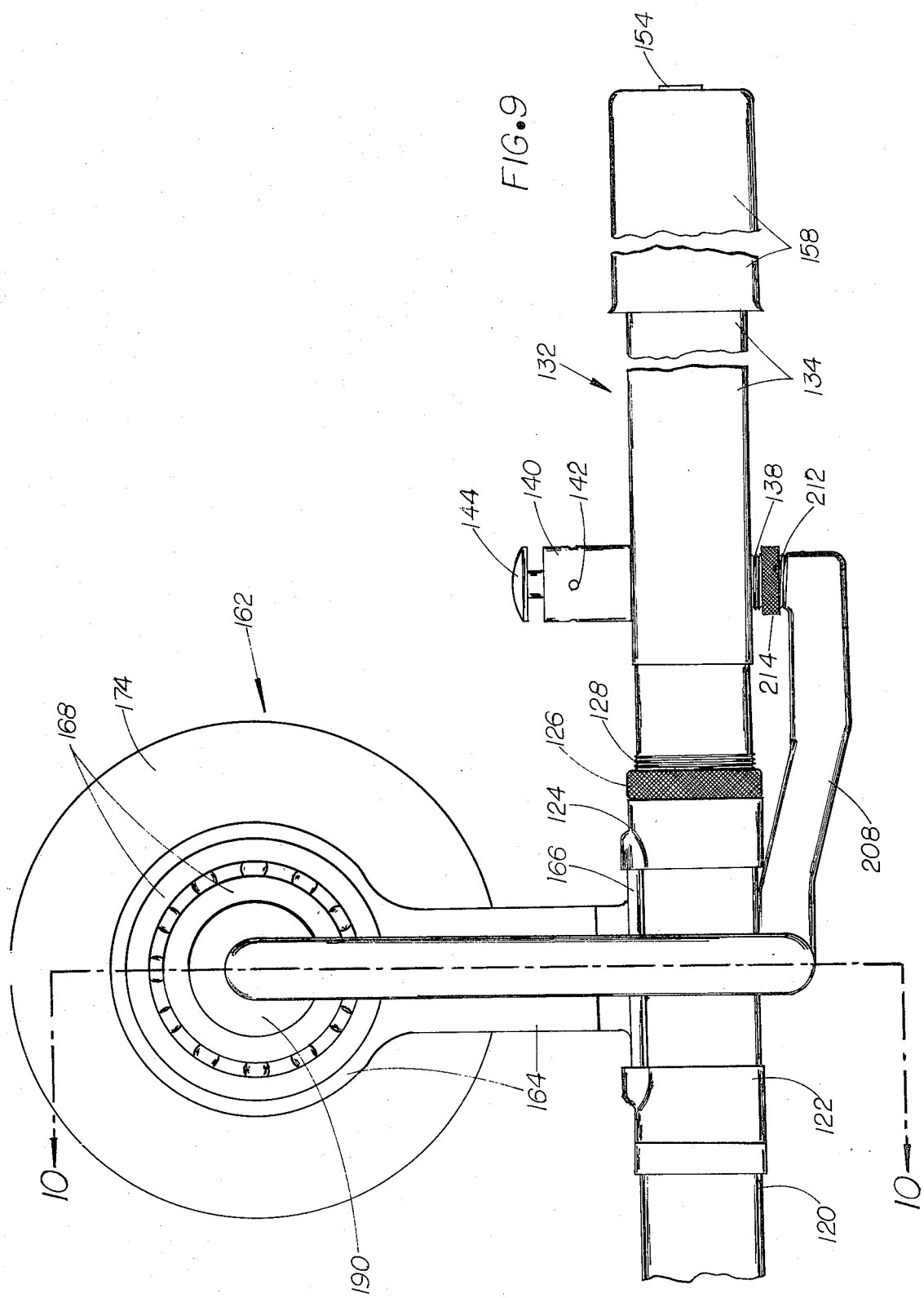

FISHING EQUIPMENT

BACKGROUND OF THE INVENTION

Game fish tend to strike at live bait and at lures which are moved in a life-like manner rather than to strike at lures which merely lie on, or below, the surface of a body of water. As a result, where a fisherman uses a lure rather than live bait, he usually tries to cause the lure to move in a life-like manner. In many cases, the fisherman recurrently imparts gentle tugs or forces to the lure in the hope that the resulting movements of the lure will seem life-like. However, where those tugs are imparted to the lure by moving the tip of a fishing rod, the fish can sometimes catch a glimpse of that moving tip and thereby be deterred from striking at the lure. In any event, the movement of the lure is toward the fisherman, and hence generally defines a straight line.

SUMMARY OF THE INVENTION

The present invention provides a tubular line of flexible material which can be used to cast or throw a lure onto the surface of a body of water, and uses an air-moving device, which is connected to one end of that line, to cause that lure to move in a life-like manner. If that lure is large "surface" lure, the air-moving device can be used to cause that lure to move about on the surface of that body of water in a life-like manner; and, if that lure is a heavier-than-water lure, that air-moving device can be used to cause that lure to move about under that surface in a life-like manner. If that lure is a small surface lure, the air-moving device can be used to selectively draw water into, or expel water from, the free end of the line, and can thereby cause that lure to move about below, or on, the surface of the body of water in a life-like manner. It is, therefore, an object of the present invention to provide a tubular line of flexible material which can be used to cast or throw a lure onto the surface of a body of water and an air-moving device which is connected to one end of that line.

The tubular line is normally coiled when it is not in use; and hence that line tends to have a configuration which is, at least in part, curved when that line is cast or thrown onto the surface of a body of water. As a result, that line can dispose the artificial lure in different positions relative to the fisherman; and the air-moving device can cause that lure to move in different directions relative to that fisherman. This is desirable, because it enables the movement of the lure to be random and not always toward the fisherman. It is, therefore, an object of the present invention to provide a tubular line that tends to have a configuration which is, at least in part, curved when that line is cast or thrown onto the surface of a body of water and that can respond to actuation of an air-moving device to move in random directions and not always toward the fisherman.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

BRIEF DESCRIPTION OF THE PREFERRED EMBODIMENTS

In the drawing,

FIG. 1 is a vertical section through one portion of one preferred embodiment of fishing equipment which is made in accordance with the principles and teachings of the present invention, FIG. 2 is a plan view of another portion of that fishing equipment, FIG. 3 is a section through the portion of the fishing equipment shown in FIG. 2, and it is taken along the plane indicated by the line 3—3 in FIG. 2, FIG. 4 is a horizontal section through a portion of another preferred embodiment of fishing equipment which is made in accordance with the principles and teachings of the present invention, FIG. 5 is a side elevational view of a preferred form of lure which is made in accordance with the principles and teachings of the present invention, FIG. 6 is a sectional view through the lure of FIG. 5, and it is taken along the plane indicated by the line 6—6 in FIG. 5, FIG. 7 is a small-scale side elevational view of a fishing rod with which the fishing equipment of FIGS. 1–3 is associated, FIG. 8 is a perspective view, on a larger scale, of the clamp which secures the portion of the fishing equipment shown in FIG. 1 to the fishing rod shown in FIG. 7, FIG. 9 is a broken, side elevational view of a further embodiment of fishing equipment which is made in accordance with the principles and teachings of the present invention, FIG. 10 is a sectional view through the embodiment of fishing equipment shown in FIG. 9, and it is taken along the plane indicated by the line 10—10 in the FIG. 9, FIG. 11 is a sectional view through the embodiment of fishing equipment shown in FIGS. 9 and 10, and it is taken along the broken plane indicated by the broken line 11—11 in FIG. 10, FIG. 12 is a sectional view through a further embodiment of fishing equipment which is made in accordance with the principles and teachings of the present invention, FIG. 13 is a vertical section through one portion of another preferred embodiment, and FIG. 14 is a vertical section through another portion of the embodiment of FIG. 13.

DETAILED DESCRIPTION OF THE PREFERRED EMBODIMENTS

Figure 1:
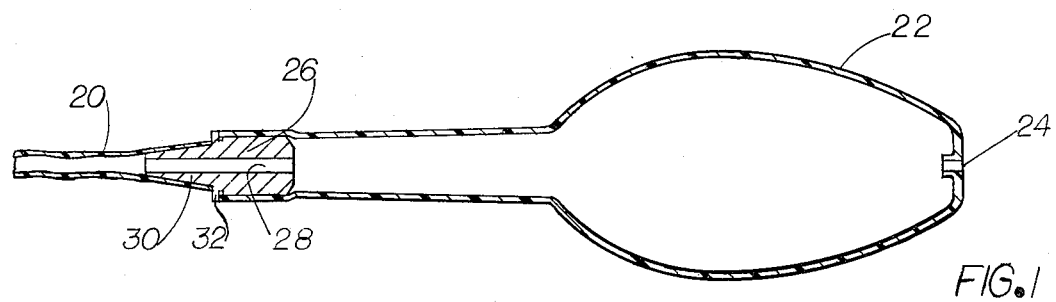

Referring to the drawing in detail, the numeral 20 generally denotes a tubular line which is made of sturdy, flexible, plastic material. That line is colorless and transparent, and it has a small outer diameter. In the preferred embodiment of FIGS. 1–3, the line 20 is TYGON flexible plastic tubing which is made by Norton Plastics and Synthetic Division, which has an outer diameter of five thirty-seconds of an inch, and which has an inner diameter of three thirty-seconds of an inch. The line 20 is flexible throughout the range of temperatures which can be experienced in fishing, it remains flexible despite aging, and it is able to withstand sunlight and exposure to the kinds of weather which can be encountered during fishing trips. The line 20 is sturdy and resistant to breakage; and it can be of any desired length. Usually that line will be long enough to enable the fisherman to cast or throw it for a considerable distance.

The numeral 22 denotes a flexible bulb which has the unstressed configuration shown by FIG. 1; but that bulb can be squeezed to expel air from it. The numeral 24 denotes a small opening in the rear of that bulb; and the fisherman's finger can be used to selectively close that opening. The bulb 22 has an elongated neck-like portion that accommodates a connector which is generally denoted by the numeral 26; and that connector has a small-diameter passage 28 therethrough and a frusto-conical tapered end 30. An annular flange 32 is provided at the large-diameter end of that frusto-conical tapered end; and that flange provides a shoulder adjacent the left-hand end of the cylindrical portion of the connector 26. One end of the line 20 is telescoped onto the frusto-conical tapered end 30 of the connector 26 until it abuts one face of the flange 32. The forward end of the neck-like portion of the bulb 22 is telescoped over the cylindrical portion of the connector 26 until it abuts the other face of the flange 32. In practice, a mere frictional engagement has been found to be sufficient betweeen the line 20 and the frusto-conical tapered end 30 of the connector 26; and, similarly, a mere frictional engagement has been found to be sufficient between the cylindrical portion of the connector 26 and the neck-like portion of the bulb 22. However, if desired, suitable cements or clamps could be used to secure the line 20 and the neck-like portion of the bulb 20 to the connector 26.

The numeral 34 generally denotes a connecting fitting which includes a female body member 36 and a male body member 48. The body member 36 has an internal thread 38, an outwardly-inclined frusto-conical flange 40 adjacent one end thereof, a passage 42 through the other end thereof, and openings 44 which communicate with that passage. As indicated particularly by FIG. 3, the passage 42 communicates with the space which is defined by the internal thread 38, and the frusto-conical flange 40 surrounds a further space which is in communication with the space defined by that internal thread. The numeral 46 denotes a wire-like connector of U-shaped configuration; and that connector has laterally-directed feet which are disposed within the openings 44.

The body member 48 has an axially-directed passage 52 therethrough which is concentric with the passage 42 in the body member 36, whenever the body members 36 and 48 are assembled. The numeral 50 denotes an external thread on the body member 48 which mates with the internal thread 38 of the body member 36. The numeral 54 denotes an annular rib of triangular cross section on the exterior of the body member 48; and that rib is located intermediate the external thread 50 and the right-hand end of that body member. As shown particularly by FIGS. 2 and 3, the other end of the line 20 is telescoped over the right-hand end and the annular rib 54 of the body member 48; and then that body member is assembled with the body member 36 to solidly clamp that end of that line to the connecting fitting 34.

The numeral 56 denotes a ring which is held by the connector 46; and that ring holds one end of a swivel 58. That swivel holds one end of a snap fastener 60; and that snap fastener is shown as holding the hook of an artificial lure 62. The ring 56, the swivel 58, the snap fastener 60, and the artificial lure 62 are of standard and usual design and will be familiar to most fishermen.

The bulb 22 serves as an air-moving device; and that bulb and the line 20 can be used by a fisherman who is doing hand fishing. The lure 62 is shown as a small surface lure; and, when the fisherman uses his hands to throw or cast a length of the line 20 away from him and onto the surface of a body of water, that lure and that line will float. However, the passage 42 will have at least a portion thereof extending down into the water. Because the line 20 will ordinarily be coiled during the periods between fishing trips, that line will tend to have some curvature even when it is cast or thrown onto the surface of the body of water. The overall result is that the end of the line to which the lure 62 is secured will have random positioning relative to the fisherman.

To cause the lure 62 to move in a life-like manner, the fisherman can close the opening 24 with one of his fingers or with his thumb and then lightly squeeze the bulb 22. The resulting ejection of a small jet of air from the passage 42 in the connecting fitting 34 will cause movement of that connecting fitting, of the ring 56, of the swivel 58, of the snap fastener 60, and of the lure 62. The amount of air in any given jet of air, the energy developed by any given jet of air, and the duration of any given jet of air will be functions of the squeezing action which the fisherman applies to the bulb 22. By varying the amount of air in a given jet of air, by varying the energy in a given jet of air, and by varying the duration of a given jet of air, the fisherman can make the lure 62 move in a life-like manner.

If desired, the fisherman can place one of his fingers or his thumb over the opening 24 only when he squeezes the bulb 22, and can remove that finger or thumb when he permits that bulb to return to its normal, unstressed configuration of FIG. 1. In such event, the fisherman will provide a series of jets of air from the passage 42 in the connecting fitting 34. On the other hand, if the fisherman holds one of his fingers or his thumb over the opening 24 during the time the bulb 22 is permitted to return to its normal, un-stressed configuration of FIG. 1, water will be drawn inwardly through the passage 42, through the passage 52, and into the line 20. Thereafter, as long as the fisherman holds one of his fingers or his thumb over the opening 24, recurring compressions and expansions of the bulb 22 will cause water to pass outwardly from, and then back into, the connecting fitting 34. The water which passes outwardly from the connecting fitting 34 will have the form of a jet of water; and that jet of water will cause movement of that connecting fitting, of the ring 56, of the swivel 58, of the snap fastener 60, and of the lure 62. The amount of water in any given jet of water, the energy developed by any given jet of water, and the duration of any given jet of water will be functions of the squeezing action which the fisherman applies to the bulb 22. By varying the amount of water in a given jet of water, by varying the energy in a given jet of water, and by varying the duration of a given jet of water, the fisherman can make the lure 62 move in a life-like manner.

Because the line 20 will ordinarily be coiled during the periods between fishing trips, that end of the line to which the lure 62 is secured will have random positioning relative to the fisherman. Such random positioning will enable the movements of the lure 62, which are induced by the jets of water, to be in random directions relative to the fisherman. As a result, the fisherman is able to cause the lure 62 to move in different directions, and need not cause that lure to move progressively toward him along a generally straight line.

If desired, the fisherman can cause sufficient water to be drawn into the line 20 to decrease the buoyancy of that line to the point where the lure 62 will sink downwardly below the surface of the water. At such time, that lure can perform the functions of a heavier-than-water lure. This means that the fishing equipment of FIGS. 1-3 can be used to cause a small surface lure to function in the manner of a heavier-than-water lure.

The fisherman can, at any time he desires, expel the water from the line 20 by using one of his fingers or his thumb to close the opening 24 when he squeezes the bulb 22 and by removing that finger or thumb when he permits that bulb to return to its normal, unstressed state. At such time, the lure 62 will again function as a surface lure. This means that by appropriate positioning of one of his fingers or his thumb, while he squeezes the bulb 22, a fisherman can cause a small surface lure to function as a surface lure, to function as a heavier-than-water lure, or to function successively as a surface lure and a heavier-than-water lure.

If desired, the fisherman can cause only limited quantities of water to be drawn into the line 20. Where that is done, and where those quantities of water are largely expelled each time the fisherman squeezes the bulb 22, the lure 62 can effectively function as a surface lure; and yet the squeezing of that bulb will develop jets of water. Conversely, if desired, sizable quantities of water can be drawn into the line, and those quantities of water can be expelled only momentarily. Where that is done, the lure 62 can effectively function as a heavier-than-water lure; and yet the squeezing of the bulb 22 can cause bubbles of air to issue from the connecting fitting 34. It thus should be apparent that the present invention makes it possible for a fisherman to use a simple and inexpensive lure, such as the lure 62, in a number of ways.

When the bulb 22 is used to recurrently cause water to enter the end of the tube 20, a number of spaced-apart, thin films of water will form within that tube; and those thin films of water will extend transversely of the axis of that tube. Those thin films of water will be spaced apart by bubbles or quantities of air within the tube 20; and those thin films of water will "work" their way through that tube toward the bulb 22. When those thin films of water work their way close enough to the fisherman to enable him to see them, he can gauge the extent of movement of the jetted water, and hence the movement of the lure, with a high degree of precision.

Once the fisherman has cast or thrown the line 20 onto the water, he need not make any pronounced movements of any part of his body. Instead, he need only manipulate one hand to cause the bulb 22 and the line 20 to impart the desired motion to the lure 62. This is important; because it means that the lure can be caused to move without alarming or alerting the fish. By proper manipulation of the bulb 22, it is possible for a fisherman to cause the lure 62 to move dozens of yards on or through the water. As a result, with a single casting or throwing of the line 20, and with subsequent squeezings and releasings of the bulb 22, a fisherman can effectively fish a large area.

Figure 3:
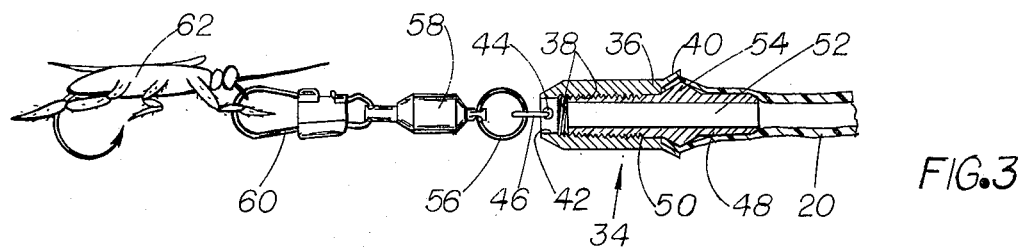
Figure 4:
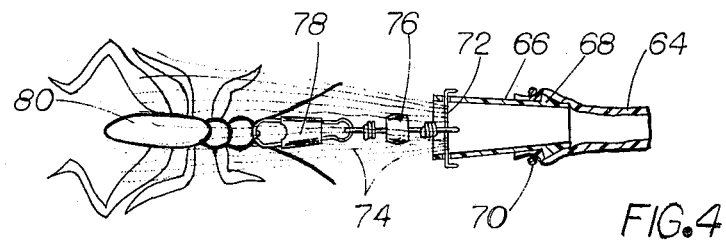

Referring particularly to FIG. 4, the numeral 64 denotes a line which can be identical to the line 20. The numeral 66 denotes aa connecting fitting which is made as a single piece, rather than being made with two body members—as is the connecting fitting 34 of FIGS. 2 and 3. The connecting fitting 66 has a passage therethrough which is smaller at the right-hand end thereof than it is at the left-hand end thereof. That connecting fitting is shown as being frusto-conical in configuration, but it could be given any desired configuration. An annular rib 68 of triangular cross section is provided adjacent the right-hand end of the connecting fitting 66; and the left-hand end of the line 64 is telescoped over that annular rib. A stiff, resilient, split-ring 70 surrounds that end of the line 64 which has been telescoped over the annular rib 68; and that stiff, resilient, split-ring will fixedly secure that connecting fitting to that line.

The numeral 72 denotes a U-shaped connector which is held within openings in the left-hand end of the connecting fitting 66, as shown by FIG. 4. The numeral 74 denotes elongated fibers or threads of a readily-flexible, small-diameter, water-resistant material such as nylon. Those fibers or threads are passed around the U-shaped connector 72, and then are permitted to extend appreciable distances to the left of the connecting fitting 66. Those threads or fibers can be suitably connected to that U-shaped connector by a cement or by tying those threads or fibers to that connector. The numeral 76 denotes a swivel of standard and usual form, and the numeral 78 denotes a snap fastener which secures a lure 80 to that swivel.

Figure 2:
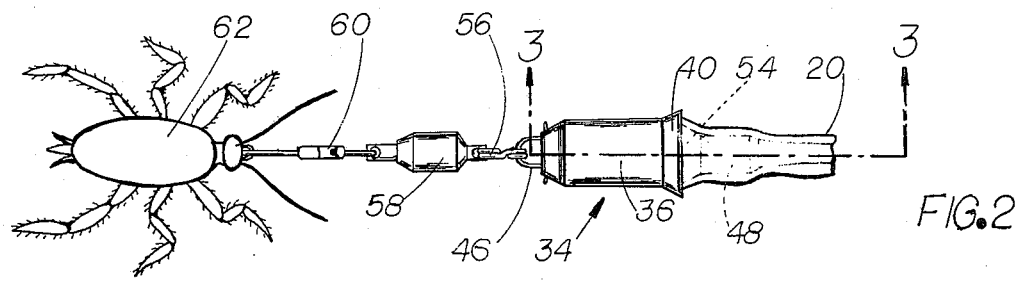

The function and operation of the fishing equipment shown in FIG. 4 can be identical to the function and operation of the fishing equipment shown in FIGS. 1-3. The primary difference between the fishing equipment of FIG. 4 and the fishing equipment of FIGS. 1-3 is the lower cost and smaller size of the connecting fitting of FIG. 4.

Referring particularly to FIGS. 5 and 6, the numeral 82 generally denotes an artificial lure that has a configuration which is roughly comparable to that of a small minnow. That lure has two plural-barbed hooks of standard and usual design. The numeral 84 denotes an internal thread which extends transversely through the body of the lure 82; and that internal thread communicates with a frusto-conical recess 86 at one side of the body of that lure. The numeral 88 denotes a line which can be identical to the line 20; and the free end of that line extends into the frusto-conical recess 86. The numeral 90 generally denotes a connecting fitting which has a passage 92 therethrough, which has an annular rib 94 of triangular cross section at the exterior thereof, and which has an external thread 96. The free end of the line 88 is telescoped over the annular rib 94 of the connecting fitting 90, and then is telescoped into the frusto-conical recess 86 in the lure 82. That free end is fixedly clamped between the inner surface of the frusto-conical recess 86 and the left-hand face of the annular rib 94, as shown particularly by FIG. 6.

The source of air, not shown, which is connected to the other end of the line 88 can be used to eject jets of air, jets of water, or alternate jets of air and water from the passage 92 in the connecting fitting 90. As can be seen from FIG. 6, those jets will be directed perpendicularly of the long axis of the lure 82; and hence they will cause the lure 82 to move laterally rather than longitudinally. The nature of the jet, the amount of material in the jet, the energy of the material in the jet, and the duration of the jet can be controlled by the fisherman, and they will directly affect the extent of movement of the lure 82. By appropriately controlling the nature of, the amount of material in, the energy of the material in, and the duration of the jets, the fisherman can impart various life-like movements to the lure 82.

Referring particularly to FIG. 7, the numeral 98 denotes a fishing rod of standard and usual design; and that fishing rod has a handle 100, line guides 102, and a tip 104. The numeral 106 denotes a clamp which can be made as a single piece of metal that has been formed to define two generally-cylindrical recesses. One of those recesses is dimensioned to closely encircle the rod 98, and the other of those recesses is dimensioned to closely encircle the neck-like portion of the bulb 22. A bolt 108 passes through an opening in the clamp 106 and engages a nut, not shown. That nut and bolt coact to cause that clamp to tightly grip the rod 98 and the neck-like portion of the bulb 22. The line 20 is passed through the line guides 102 and through the opening in the tip 104, in the same manner in which a standard and usual fly line, spinning line, or bait-rod line would be passed through those line guides and the opening in that tip.

The rod 98 will enable a fisherman to cast the free end of the line 20 much further and with much greater accuracy than the fisherman could cast it by casting or throwing that line by hand. However, once the rod 98 has performed its function of casting the line 20, that rod need not be used to effect movement of any lure attached to the line 20. Instead, any and all desired movements of that lure can be effected by appropriate manipulation of the bulb 22.

Figure 10:
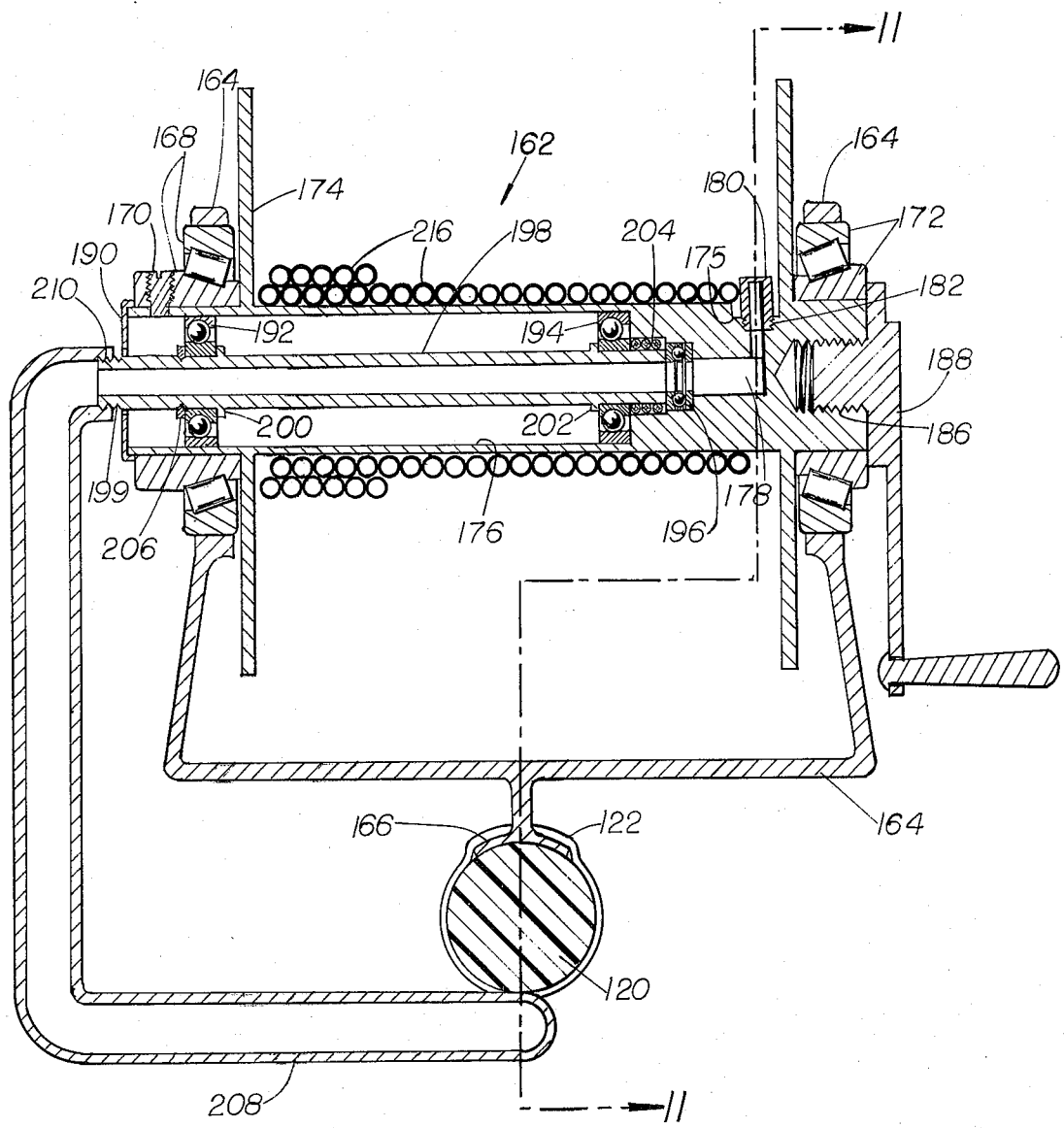
Figure 11:
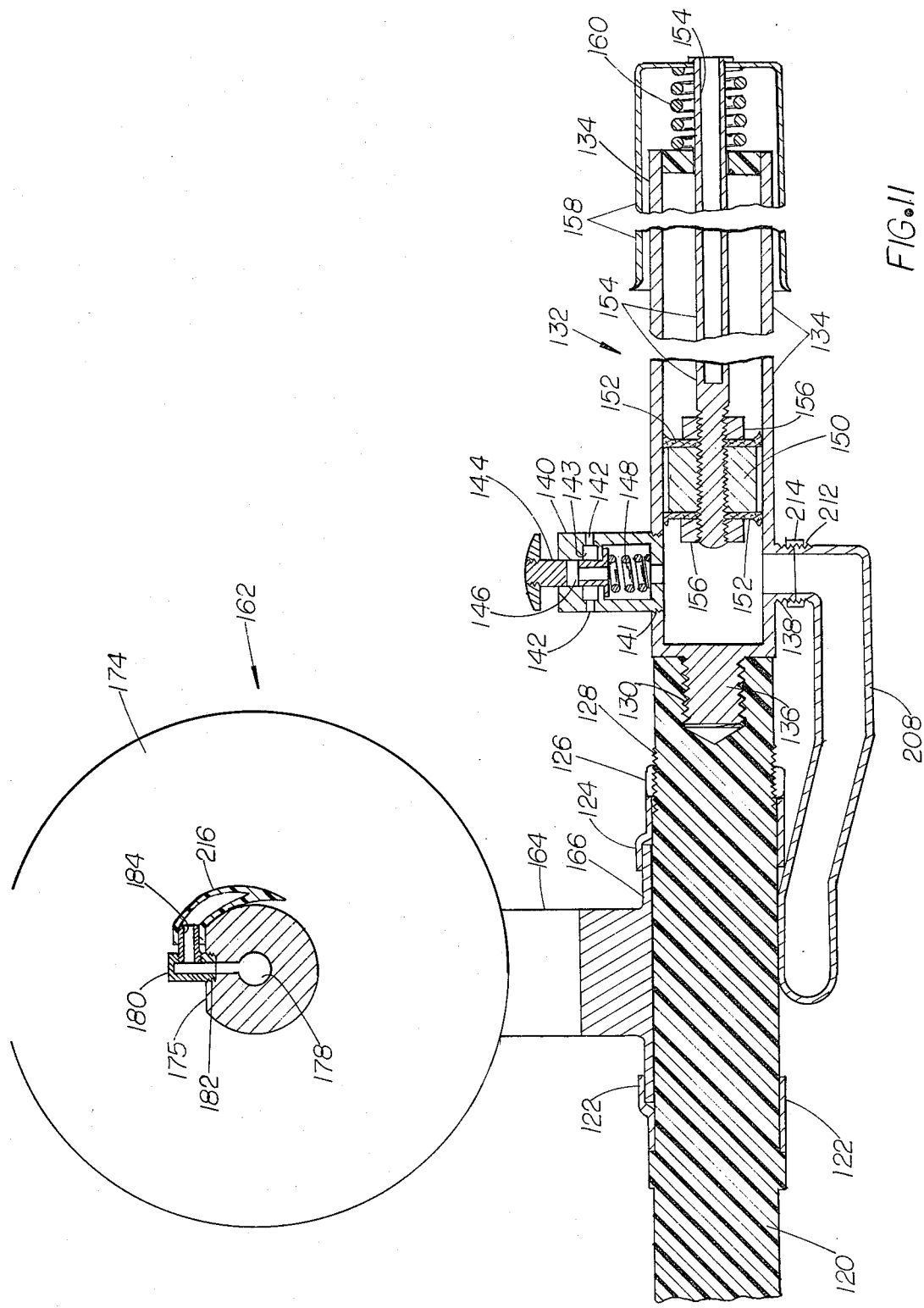

Referring particularly to FIG. 9–11, the numeral 120 denotes a fishing rod which is made in accordance with the principles and teachings of the present invention. That fishing rod can be very similar to a standard and usual fishing rod; but it has a threaded socket 130 in the butt end thereof, as shown particularly by FIG. 11. That fishing rod has clamps 122 and 124, of standard and usual design, thereon to receive and the hold the "foot" of a fishing reel. A knurled nut 126 is threadably mounted on an external thread 128 on the fishing rod 120; and that knurled nut can be used to force the clamp 124 into holding engagement with the foot of a fishing reel.

The numeral 132 generally denotes a pump which is attached to the fishing rod 120, and which effectively serves as a part of that fishing rod. That pump has a cylindrical housing 134 with a threaded stud 136 on the forward end thereof; and that threaded stud extends into, and is held by, the threaded socket 130 in the fishing rod 120. A hollow, threaded projection 138 extends outwardly from one side of the housing 134, as shown by FIGS. 9–11. Although that projection is shown as an integral part of that housing, that projection preferably will be a nipple which is held by a threaded socket in the side of that housing. The numeral 140 denotes a valve housing which has a threaded end that is seated within a threaded opening 141 in the side of the housing 134. Four ports 142 are provided in the side of the valve housing 140; and an annular recess 143 interconnects those ports. A reciprocable valve element 144, with a T-shaped passage 146 therein, is disposed within a passage in the valve housing 140. A helical compression spring 148 biases the transept of the T-shaped passage 146 outwardly of, and out of register with, the annular recess 143 and the ports 142. However, that spring can yield to permit that transept to be moved into register with that annular recess and those ports.

The numeral 150 denotes a cylindrical member which has an internal thread that is threaded onto the threaded end of a piston rod 154. Seals 152 are disposed at the end faces of the cylindrical member 150; and those seals are held in intimate engagement with those end faces, and that cylindrical member is held against shifting relative to the piston rod 154, by nuts 156 which are threaded onto the threaded end of the piston rod. The seals 152 have unstressed diameters which are larger than the inner diameter of the housing 134; and hence those seals effectively prevent leakage of air past the cylindrical member 150. The numeral 158 denotes a handle for the pump; and that handle is a tube with an essentially-closed right-hand end. That essentially-closed end is fixedly secured to the right-hand end of the piston rod 154, so that handle and that piston rod move as a unit. The numeral 160 denotes a helical compression spring which urges the handle 158 and the piston rod 154 to the right in FIGS. 9 and 11. However, that helical compression spring can yield to permit that handle and that piston rod to be moved to the left.

The numeral 162 generally denotes a fishing reel which is made in accordance with the principles and teachings of the present invention; and that fishing reel includes a yoke 164 which has a foot 166. That foot is intended to, and can, be held by the clamps 122 and 124; and, as a result, the reel 162 can be rigidly clamped to the fishing rod 120. The numeral 168 denotes a bearing which has the outer race thereof disposed within a circular opening in one arm of the yoke 164. A screw 170 secures the inner race of that bearing to the left-hand end of a flanged drum 174 of the reel 162, as that reel is viewed in FIG. 10. The numeral 172 denotes a bearing which has the outer race thereof disposed within a circular opening in the other arm of the yoke 164; and the inner race of that bearing accommodates the other end of the flanged drum 174. That flanged drum has a flat surface 175 machined thereon at a point adjacent the inner face of the right-hand flange thereof, as shown particularly by FIGS. 10 and 11. The numeral 176 denotes a large-diameter, elongated cylindrical recess within the flanged drum 174; and the numeral 178 denotes an L-shaped passage which extends from that recess to a threaded socket 182 adjacent the flat surface 175. A hollow fitting 180 has a threaded end which extends into, and is held by, the threaded socket 182; and a nipple 184 is threaded into a threaded socket in one side of that fitting. The nipple 184 is spaced a short distance away from the flat surface 175 on the flanged drum 174, as shown by FIG. 11. The numeral 186 denotes a threaded socket in the right-hand end of the flanged drum 174, as that flanged drum is viewed in FIG. 10; and a threaded stud on a handle 188 is threaded into that threaded socket. That handle acts to hold the inner race of the bearing 172 in engagement with, and against rotation relative to, the flanged drum 174. The numeral 190 denotes a flanged annular closure for the left-hand end of the recess 176 in the flanged drum 174.

The numeral 192 denotes a bearing which has the outer race thereof engaging the inner surface of the recess 176 and which has the inner race thereof engaging a stationary tube 198. The numeral 194 denotes a second bearing which has the outer race thereof engaging the inner surface of the recess 176 and which has the inner race thereof engaging the tube 198. The left-hand end of that tube has an external thread 199, as shown by FIG. 10. Flanges 200 and 202 are provided on the tube 198 to determine the positions of the inner races, respectively, of the bearings 192 and 194. A snap ring 206 coacts with the flange 200 to fix the position of the inner race of the bearing 192. The outer race of the bearing 194 engages the inner end of the recess 176; and the inner race of that bearing engages an O-ring 204 which is one of several O-rings that encircle the tube 198. Those O-rings provide an air-resisting seal between the flanged drum 174 and the tube 198. The numeral 196 denotes a thrust bearing adjacent one end of the passage 178 which abuts the right-hand end of the tube 198.

The numeral 208 denotes a tube which has an internal thread 210 at one end thereof, as shown by FIG. 10; and that tube has an external thread 212 at the other end thereof, as shown by FIGS. 9 and 11. That internal thread mates with the external thread 199 on the left-hand end of the tube 198. The external thread 212 is aligned with the external thread on the projection 138; and a knurled nut 214 fixedly holds the external thread 212 against movement relative to the external thread on that projection.

The numeral 216 denotes a tubular line which can be identical to the line 20 of FIGS. 1–3. One end of that line is distended and is telescoped over the nipple 184, and thus is secured to the flanged drum 174 while being placed in communication with the passage 178 in that flanged drum. The other end of the line 216 will be passed through the line guides of the fishing rod 120, will be passed through the opening in the tip of that fishing rod, and will have a suitable lure secured to it.

To enable the novel structure of the reel 162 to be shown with maximum clarity, that reel has not been shown as being equipped with a level-winding mechanism, with a brake or drag, or with any of the many attachments which are integral parts of many fishing reels. However, if desired, the fishing reel 162 can be equipped with any of the standard and usual attachments and accessories used in fishing reels. If a level-winding mechanism is incorporated into the reel 162, that level-winding mechanism would have to be made large enough to accommodate the line 216.

When the valve element 144 is left in the position shown by FIGS. 9 and 11, that valve element will prevent the passage of air into or out of the pump 132. At such time, movement of the piston rod 154 to the right will cause water to be drawn into the free end of the line 216, and movement of that piston rod to the left will cause ejection of a jet of water from that free end. As a result, repeated reciprocations of the handle 158 will, whenever the valve element 144 is in the position shown by FIGS. 9 and 11, cause repeated ejections of jets of water from the free end of the line 216. Those jets of water will provide desirable movements of the lure, not shown, which will be attached to the free end of that line. By controlling the speed and lengths of the various reciprocations of the hanndle 158, the fisherman can cause that lure to move in a life-like manner.

If the fisherman wishes to draw air into the pump 132, he need only press inwardly on the valve element 144 as he moves the handle 158 to the right. Thereafter, if he permits that valve element to return to the position of FIGS. 9 and 11, and then moves the piston rod to the left, he will force a quantity of air to pass through the line 216 and out through the free end of that line. By appropriate manipulation of the valve element 144, the fisherman can eject jets of air, jets of water, or alternating jets of water and air from the free end of the line 216. Consequently, the fisherman can provide many desired movements of the lure attached to that line.

Because the line 216 is usually wound on the flanged drum 174 when the fishing equipment of FIGS. 9–11 is not in use, that line will tend to assume a generally circular configuration when it is cast onto the surface of a body of water. As a result, the jets of water or air which are ejected from the free end of the line 216 can cause random movement of that free end, and hence of the lure attached to that free end.

The fishing equipment of FIGS. 9–11 can provide the various actions which can be provided by the fishing equipment of FIGS. 1–3. However, the pump 132 can provide more displacement of air or water than can the bulb 22 of FIG. 1. This means that more active and more extensive movement of the lure can be attained with the fishing equipment of FIGS. 9–11 than can be attained with the fishing equipment of FIGS. 1–3.

The fishing rod 120 will be used to cast the lure away from the fisherman, and then the tip of that fishing rod can be left close to the surface of the water — to minimize the likelihood of the fish seeing that fishing rod. Thereafter, the desired movements of the lure can be effected by appropriate manipulation of the pump and of the valve element 144. When a fish "takes" the lure, the line 216 can be reeled in by appropriate rotation of the handle 188. Also, in the event a fish does not take the lure, that line can be reeled in by appropriate rotation of that handle. Because the free end of the line 216 will assume a random orientation relative to the fisherman, as that line is cast onto the surface of a body of water, the ejection of jets of water from the free end of that line can cause that line to move over a large area of that surface. Consequently, the number of times the lure must be thrown or cast can be sharply reduced; and hence the likelihood of the fish being alarmed by the movement of the fishing rod is sharply decreased.

Figure 12:
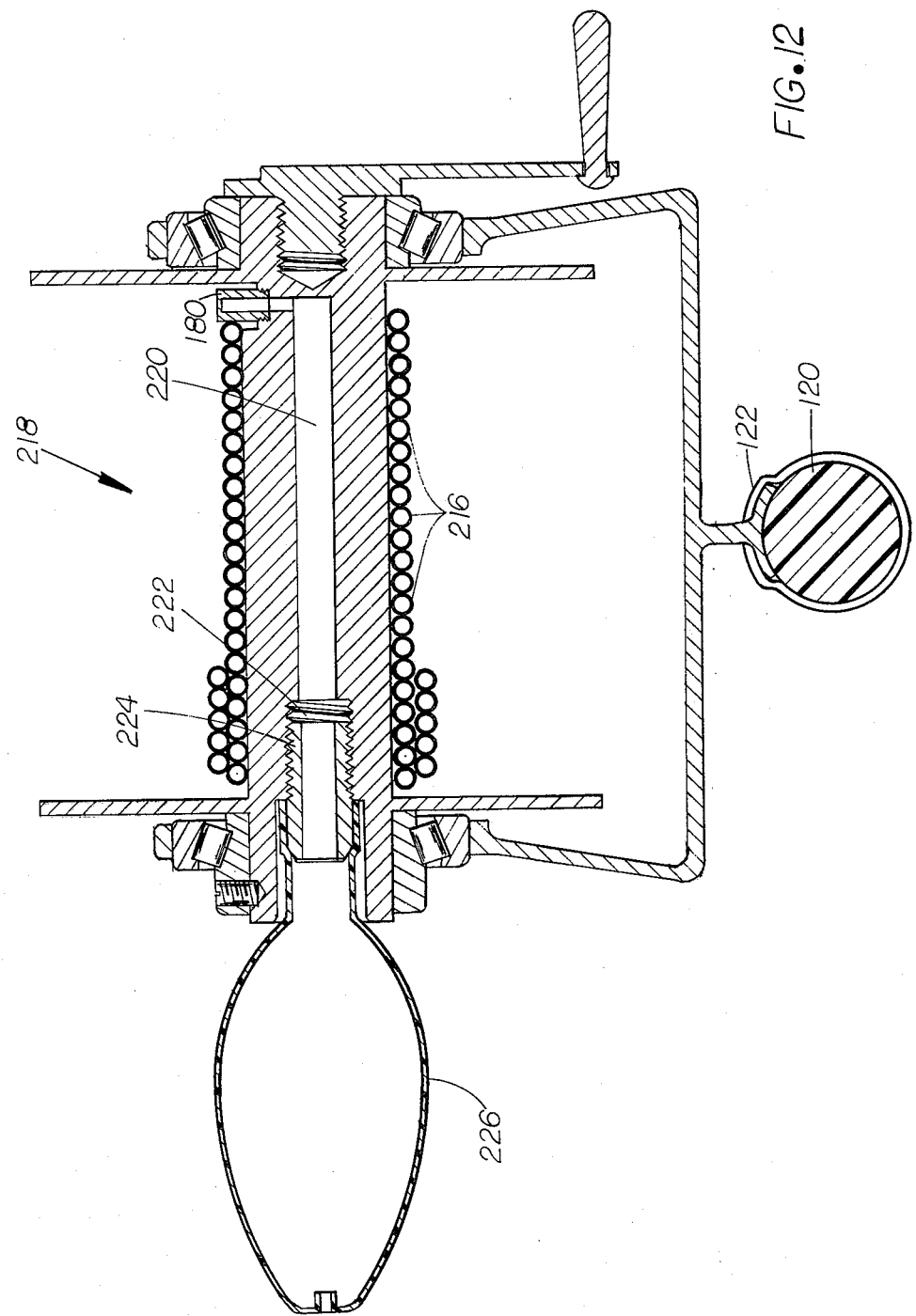

Referring particularly to FIG 12, the numeral 218 generally denotes a fishing reel which is similar to, but simpler than, the fishing reel 162 of FIGS. 9–11. Specifically, the flanged drum of the reel 218 has a passage 220 therein, and it has an internal thread 222 at the outer end of that passage. A fitting 224 has a passage therethrough, has an external thread at one end thereof, and has a larger-diameter surface at the other end thereof. The external thread mates with, and fits into, the internal thread 222; and the larger-diameter surface of that fitting accommodates the distended neck-like portion of a resilient bulb 226. The passage 220 connects the resilient bulb 226 with a fitting 180 which can be identical to the correspondingly-numbered fitting in FIGS. 10 and 11. That resilient bulb can be manipulated, in the manner in which the resilient bulb 20 of FIG. 1 is manipulated, to cause jets of air, jets of water, or alternating jets of air and water to issue from the free end of the line 216.

If desired, the resilient bulb 226, and the resilient bulb 22 of FIGS. 1 and 7, could have check valves mounted in the small openings in the outer ends thereof. Those check valves would permit air to be drawn inwardly through those small openings but would preclude the outward movements of air through those small openings. Such check valves could be particularly helpful to fly fishermen who were using small surface lures.

Figure 13:
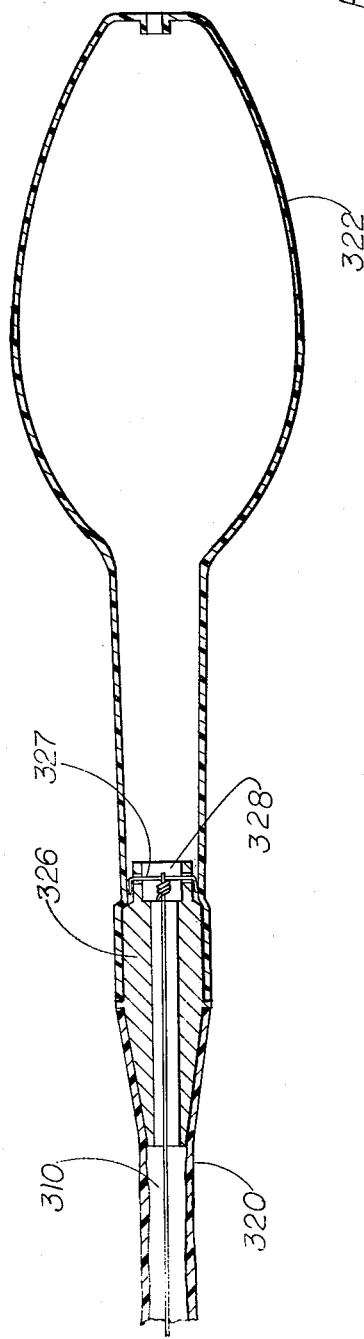
Figure 14:
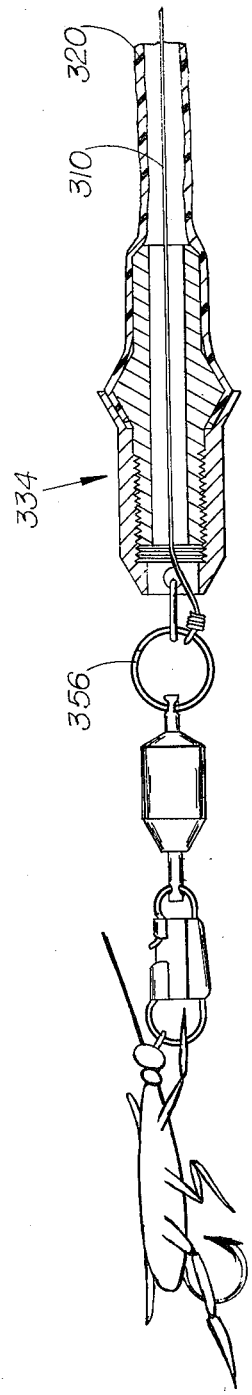

The present invention is readily adpatable for use with almost every kind or size of fishing equipment that is used for still fishing. Specifically, the present invention can be used for fly fishing, spin fishing, bait fishing, hand fishing, or any other kind of fishing. Where very large fish are sought, the outer diameter of the line will be made larger than five thirty-seconds of an inch, and the fishing reels will be made correspondingly larger. If desired, the line could be made with reinforcing fibers or threads in the wall thereof; or a tension-resisting element, such as a flexible wire or cord, could be passed through the hollow center of that line and connected to the connecting fitting, the swivel or the lure. For example, as shown by FIGS. 13 and 14, an elongated, flexible wire or cord 310 can be passed through the center of a tubular line 320 which can be very similar to, but larger in diameter than, the line 20 of FIGS. 1–3. That wire or cord should be resistant to rust or other corrosion, should not adversely affect the material of the line 320, and should have a long life. One end of that wire or cord extends into a passage 328 within a connector 326, which can be very similar to, but larger in diameter than, the connector 26 of FIGS. 1–3; and that one end is secured to a U-shaped connector 327 which spans that passage. The connector 326 is disposed within the neck-like portion of a flexible bulb 322 which can be very similar to, but larger in diameter than, the flexible bulb 22 of FIG. 1. The other end of the wire or cord 310 passes through a connecting fitting 334 which can be very similar to, but larger in diameter than, the connecting fitting 34 of FIGS. 2 and 3; and that other end is secured to a ring 356 which can be very similar to, but larger in diameter than, the ring 56 in FIGS. 2 and 3. The other components of the embodiment of FIGS. 13 and 14 can be very similar to, but larger than, the corresponding components of FIGS. 1–3. Where a tension-resisting element is used, the wall thickness of the line 320 can be made quite thin, because that tension-resisting element will effectively relieve that line of heavy tensional forces. Where a tension-resisting element is used, the internal diameter of the line 320 should be made large enough to enable that line to be buoyant when filled with air. Where that is done, that line can be used to control the movements of surface lures when it is filled with air, and can be used to control the movements of under-the-water lures when it is filled with water.

If desired, a container of compressed gas, such as air or carbon dioxide, could be used to supply air to a line of the type provided by the present invention. The use of such a container would be desirable in the event the fisherman was arthritic, or otherwise did not have ready and full use of his hands. Appropriate manipulation of the valve of that container could enable air jets of the desired duration to be ejected from the free end of that line.

The connecting fittings which are shown in FIGS. 2 and 3, in FIG. 4, and in FIG. 14 are useful and desirable; but such connecting fittings are not absolutely necessary. Other kinds of connecting fittings could be used; and, if desired, the connecting fittings of FIGS. 1–4 could be omitted. For example, if desired, a snap fastener could have one end of the resilient wire thereof opened, passed through the walls of the line 20 or 64, and then re-closed. That snap fastener would then perform the functions of the connecting fittings shown in FIGS. 2–4. If desired, appropriate floats or weights could be attached to the free end of any of the lines 20, 64, 88, 216 or 320.

Whereas the drawing and accompanying description have shown and described several preferred embodiments of the present invention, it should be apparent to those skilled in the art that various changes may be made in the form of the invention without affecting the scope thereof.

What I claim is:

1. Fishing equipment which comprises an elongated, flexible, tubular line which can be cast or thrown onto the surface of a body of water, an air-moving device which is connected to one end of said line to permit fluid to be moved within and relative to said line, said air-moving device being manipulable to enable jets of fluid to be ejected from the other end of said line, said air-moving device being manipulable to cause fluid to move inwardly relative to and also to move outwardly relative to said other end of said line, said air-moving device being manipulable to draw water into said other end of said line, and said air-moving device being manipulable to eject jets of water from said other end of said line.

2. Fishing equipment as claimed in claim 1 wherein said air-moving device is a resilient bulb which has a normal, un-stressed configuration, and wherein said aie-moving device can be compressed to eject jets of water from said other end of said line.

3. Fishing equipment as claimed in claim 1 wherein a lure can be associated with said other end of said line, and wherein said lure is held in the path of said jets of water which are ejected from said other end of said line.

4. Fishing equipment which comprises an elongated, flexible, tubular line which can be cast or thrown onto the surface of a body of water, an air-moving device which is connected to one end of said line to permit fluid to be moved within and relative to said line, said air-moving device being manipulable to enable jets of fluid to be ejected from the other end of said line, a lure which has a long axis and which can be associated with said other end of said line, and said other end of said line being directed transversely of said long axis of said lure, whereby said jets of fluid which are ejected from said other end of said line effect laterally-directed movement of said lure.

5. Fishing equipment which comprises an elongated, flexible, tubular line which can be cast or thrown onto the surface of a body of water, an air-moving device which is connected to one end of said line to permit fluid to be moved within and relative to said line, said air-moving device being manipulable to enable jets of fluid to be ejected from the other end of said line, a lure which can be associated with said other end of said line, and said other end of said line extends into said lure and can direct said jets of fluid transversely through said lure, whereby said jets of fluid which are ejected from said other end of said line effect laterally-directed movement of said lure.

6. Fishing equipment which comprises an elongated, flexible, tubular line which can be cast or thrown onto the surface of a body of water, an air-moving device which is connected to one end of said line to permit fluid to be moved within and relative to said line, said air-moving device being manipulable to enable jets of fluid to be ejected from the other end of said line, said line floating wherever it is filled with air, said line sinking whenever it is filled with water, and said air-moving device selectively drawing water into or expelling water from said line, whereby said air-moving device can selectively cause said line to float or to sink.

7. Fishing equipment which comprises an elongated, flexible, tubular line which can be cast or thrown onto the surface of a body of water, a fishing reel to which one end of said line is attached and onto which said line can be wound, an air-moving device which is connected to said fishing reel, a passage in said fishing reel which interconnects said one end of said line with said air-moving device, whereby said air-moving device can cause air to move within and relative to said line, said air-moving device being manipulable to draw water into the other end of said line, and said air-moving device being manipulable to enable jets of water to be ejected from said other end of said line.

8. Fishing equipment which comprises an elongated, flexible, tubular line which can be cast or thrown onto the surface of a body of water, a fishing reel to which one end of said line is attached, said fishing reel having a rotatable portion onto which said line can be wound, an air-moving device which is connected to said fishing reel, a passage in said fishing reel which interconnects said one end of said line with said air-moving device, whereby said air-moving device can cause air to move within and relative to said line, said air-moving device being a resilient bulb, and said resilient bulb being secured to and rotatable with said rotatable portion of said fishing reel.

9. Fishing equipment which comprises an elongated, flexible, tubular line which can be cast or thrown onto the surface of a body of water, a fishing reel to which one end of said line is attached and onto which said line can be wound, an air-moving device which is connected to said fishing reel, a passage in said fishing reel which interconnects said one end of said line with said air-moving device, whereby said air-moving device can cause air to move within and relative to said line, a valve which is selectively actuable to enable manipulation of said air-moving device to cause the fluid of said jets of fluid to be air or water.

10. Fishing equipment which comprises an elongated, flexible, tubular line which can be cast or thrown onto the surface of a body of water, a fishing reel to which one end of said line is attached and onto which said line can be wound, an air-moving device which is connected to said fishing reel, a passage in said fishing reel which interconnects said one end of said line with said air-moving device, whereby said air-moving device can cause air to move within and relative to said line, said air-moving device being manipulable to draw water into the other end of said line, and said air-moving device being manipulable to enable jets of water to be ejected from said other end of said line, a lure which can be associated with said other end of said line, a tension-resisting element which is disposed within said line, and said tension-resisting element making it possible for said fishing equipment to be used to catch larger fish that it could catch without said tension-resisting element, said tension element having a cross section which is smaller than the inner cross section of said line, whereby air can be moved through the space between the exterior of said tension-resisting element and the interior of said line.

* * * * *